United States Patent [19]

Keuchel et al.

[11] 4,227,957
[45] Oct. 14, 1980

[54] PROCESS AND APPARATUS FOR MANUFACTURING A NON-WOVEN FABRIC AND THE PRODUCT THEREOF

[75] Inventors: Herbert W. Keuchel; George A. Farris, both of Tallmadge, Ohio

[73] Assignee: PNC Company, Akron, Ohio

[21] Appl. No.: 928,613

[22] Filed: Jul. 27, 1978

Related U.S. Application Data

[62] Division of Ser. No. 771,643, Feb. 24, 1977, Pat. No. 4,141,773.

[51] Int. Cl.³ .............................................. B31F 1/00
[52] U.S. Cl. .................................... 156/443; 156/495; 156/500; 156/510; 425/66; 425/297; 425/308; 425/314
[58] Field of Search .................. 156/426–427, 156/495, 425, 429, 443, 244.11, 244.18, 244.15; 264/209, 210 R; 425/325, 66, 71, 72 R, 308, 314, 403, 296, 297

[56] References Cited

U.S. PATENT DOCUMENTS

| | | | |
|---|---|---|---|
| 2,943,356 | 7/1960 | Rasmussen | 264/138 |
| 3,322,613 | 5/1967 | Rasmussen | 428/484 |
| 3,342,657 | 9/1967 | Oyer | 156/163 |
| 3,354,253 | 11/1967 | Rasmussen | 264/288 |
| 3,403,203 | 9/1968 | Schmirmer | 264/51 |
| 3,409,495 | 11/1968 | Rasmussen | 264/75 |
| 3,472,924 | 10/1969 | Sederlund et al. | 264/209 |
| 3,511,742 | 5/1970 | Rasmussen | 425/66 X |
| 3,539,666 | 11/1970 | Schirmer | 264/210 R X |
| 3,551,254 | 12/1970 | Warner et al. | 156/426 |
| 3,553,065 | 1/1971 | Stumpf et al. | 156/249 X |
| 3,580,784 | 5/1971 | Lee et al. | 156/429 |
| 3,581,344 | 6/1971 | Sederlund et al. | 264/290 |
| 3,596,321 | 8/1971 | Vpmeier | 425/66 X |
| 3,674,898 | 7/1972 | Larsen | 264/210 R X |
| 3,711,231 | 1/1973 | Chess | 425/127 |
| 3,717,541 | 2/1973 | Schmirmer | 156/229 X |
| 3,905,736 | 9/1975 | Bringham | 264/165 X |

Primary Examiner—David A. Simmons
Attorney, Agent, or Firm—John E. Benoit

[57] ABSTRACT

A thermoplastic web of indeterminate length is provided by forming a tubular thermoplastic web having interconnected filaments. The web is rotated about its axis while being advanced along its axis and is slit so as to provide a web having substantially parallel filament alignment at an angle to the longitudinal axis of the web. The web may be formed into a multiply structure having a plurality of webs wherein the filament alignment of at least one of the webs of the structure is at an angle to the filament alignment of at least one of the other webs of the structure.

16 Claims, 12 Drawing Figures

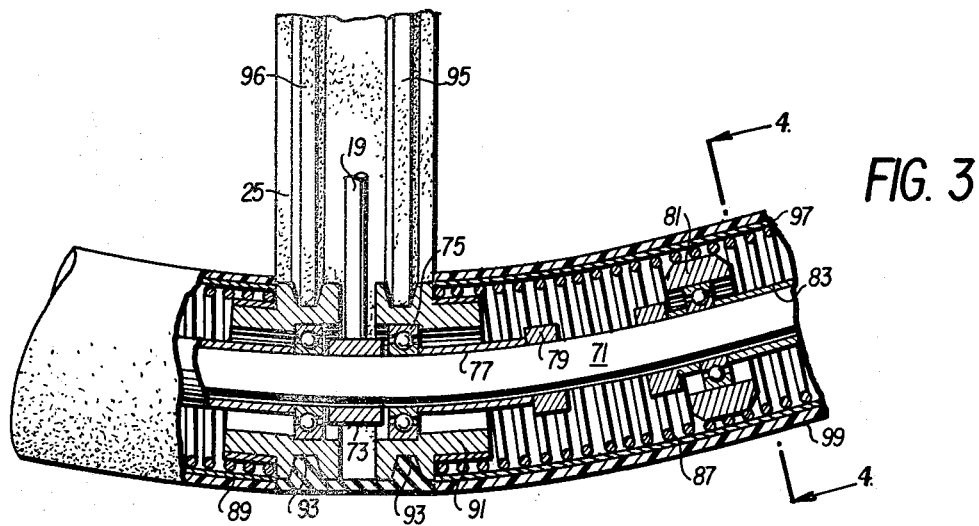
FIG. 3
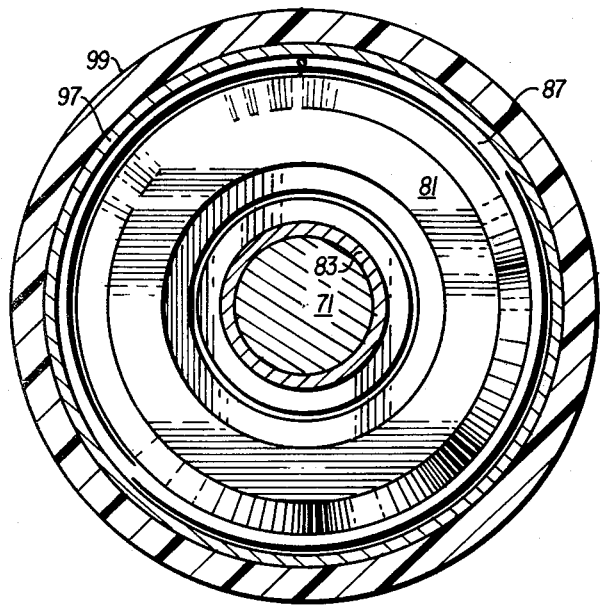
FIG. 4
FIG. 5
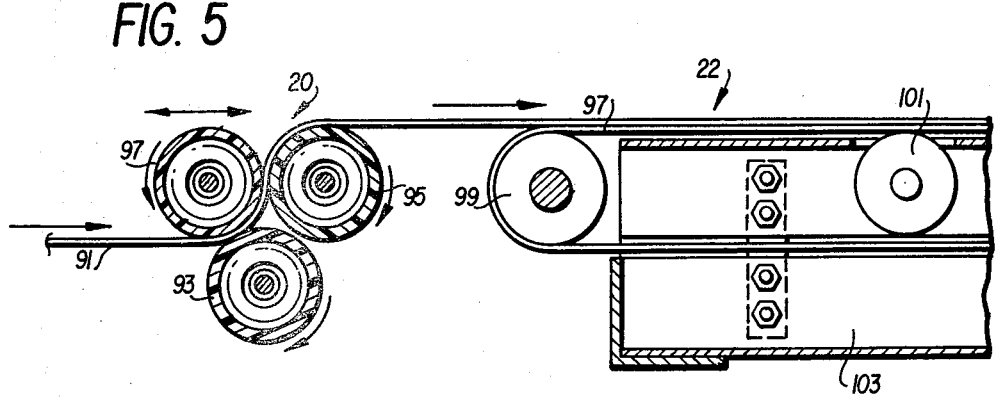

PROCESS AND APPARATUS FOR MANUFACTURING A NON-WOVEN FABRIC AND THE PRODUCT THEREOF

This is a division of application Ser. No. 771,643, filed Feb. 24, 1977, now U.S. Pat. No. 4,141,773.

BACKGROUND OF THE INVENTION

This application relates generally to a process and apparatus for manufacturing non-woven material and the product thereof.

There are a number of applications wherein it is desired to form and feed various types of tubular material. These applications primarily relate to the formation of the tubular material from various plastic materials. One such application is the manufacturing of plastic tubular pipe. In the manufacture of such pipe, various systems have been devised wherein liquified material may be fed to a forming device which accepts the material and feeds it along a path during solidification thereof to ultimately form the pipe. One of the known means of accomplishing this operation is to use a series of belts which have a substantial longitudinal dimension and are of such a width that the use of a substantial number arranged in a circular fashion will approximate a circle. As can be seen, the use of such equipment involves extensive apparatus and results in a relatively expensive machine. Additionally, the use of so many individual units precludes the possibility of having a perfectly smooth structure which has a consistent width dimension.

There has also been proposed a system wherein biaxially oriented thermoplastic resinous film is prepared by extruding a tube and stretching same by a rotating tori whereby the film is oriented.

Another field of endeavor wherein such a structure is proposed is in the field of the production of non-woven webs of polymeric materials. In a specific manufacturing technique, these materials are developed through the use of an annular extruding device which feeds a molten material through an extrusion slot with a quenching step solidifying the material shortly after it exits from the extruder. This process requires some means for moving the material away from the extruder after solidification.

If the above extruder device contains an annular slot, the material will be formed in a tubular fashion and must be removed from the extruder in that geometric form even though it may be slit subsequently to form a flat sheet. A proposed way for removing this material is to have the tubular solidified material pass over a mandrel with some means for exerting a pulling force so as to stretch the extrudate, fibrillate, draw and collect the tubular material. A major problem involved in this type of operation results from the friction created between the material and the mandrel itself. This friction imposes severe limits on the speed at which the material may be produced and therefore, greatly reduces the efficiency of the operation.

A further problem involved in producing web material is the structural strength ch the web material may have in both the machine direction and the transverse direction. Normal web structure has a filament alignment which generally parallels that of the machine direction. This, of course, means that the structural strength is stronger in the machine direction than it is in the transverse direction. Therefore, in any type of multiply operation, it does not do any good to merely lay one continuously produced web over another in the same direction since such an operation will merely be increasing the already existing strength in the machine direction without improving the transverse strength of the web. Attempts have been made to overcome this problem by overlapping the material. However, it is obvious that overlapping in order to obtain a 90° filament cross-alignment would be very tedious and almost impossible to produce by a continuous operation. Additionally, overlapping marks are visible which precludes use for aesthetic as well as practical reasons. Attempts have been made to provide such an overlapping by a spiral winding technique in order to get an angle between the filament alignment of the webs in the multiply structure. However, such overlapping is not feasible with light and drapy materials over any large diameters, expecially when a low number of plies are used since it produces extra thick portions and destroys the continuity of the multiply material.

Some known experiments have attempted to scramble the filaments in order to obtain some type of equal strength in the machine direction and in the transverse direction, but this has not proven to be effective, nor has it produced a practical product since it also includes the overlapping of the webs with resultant discontinuities.

Many of the above discussed approaches are shown in the following U.S. Pat. Nos.:

3,905,736 Bringham
3,342,657 Dyer
3,472,924 Sederlund et al
3,711,231 Chess et al
3,539,666 Schirmer
3,403,203 Schirmer
3,717,541 Schirmer
3,581,344 Sederlund et al
2,943,356 Rasmussen
3,322,613 Rasmussen
3,354,253 Rasmussen
3,409,495 Rasmussen The present invention, for the first time, provides an effective alignment of filaments at an angle to the machine direction of the resultant web through a unique cutting procedure. The resultant web may then be plied or overlapped without any of the previously existing problems of discontinuities.

It should be noted that, when providing the multiply product, the webs may be bonded in any of the well known ways such as thermal bonding, sonic bonding, mechanical bonding by needle punching or stitch bonding or sewing, or adhesive can be used to make all plies adhere together.

An object of this invention is to produce a continuous web material having an effective alignment of filaments at an angle to the machine direction of the web being produced.

Another object of this invention is to provide a thermoplastic web of indeterminate length having substantially parallel filament alignment with the alignment being at a predetermined angle to the longitudinal axis of the web.

Yet another object of this invention is to provide a multiply structure having multiple webs wherein the effective alignment of filaments in at least one web is at a substantial angle to the effective alignment of filaments in the remaining webs.

These and other objects of the invention will become apparent from the following descriptions when taken in conjunction with the accompanying drawings wherein:

FIG. 3 is a cross sectional view taken along the lines 3—3 of FIG. 2;

FIG. 4 is a cross sectional view taken along the lines 4—4 of FIG. 3;

FIG. 5 is a partial schematic illustration of the nip roll and take-up device of FIG. 1;

BRIEF SUMMARY OF THE INVENTION

The present invention provides a process, apparatus and product wherein a tubular web of interconnecting filaments is advanced in a direction along its axis and simultaneously rotated about its axis. While the tubular web is being so moved, it is slit at an angle to the direction of advancement. A nip roll having two driven rolls and one idler roll may be used to advance the web material. The resultant web may then be multi-plied into a composite structure wherein at least one of the webs has a filament alignment at a substantial angle to the filament alignment of the remaining webs in the multi-plied structure.

GLOSSARY OF TERMS

In order to clarify the following description, a glossary of terms and the definitions intended are submitted herewith.

$U_L$: Speed of advancement of the tubular web in a direction along its axis.

$U_R$: Speed of rotation of the tubular web about its axis.

$\alpha$: The angle at which the tubular web is cut across its axis.

FILAMENT: substantially any directionally attenuated segments within a web structure.

FILAMENT ATTENUATION: foam distortion into interconnected filaments.
  a. filament attenuation formed by melt phase foam distortion into interconnected filament, as disclosed in pending U.S. application Ser. No. 613,093 filed Sept. 15, 1975 and assigned to the assignee of the present invention, or
  b. stretching of a solidified foam structure into interconnected filaments.

FILAMENT ORIENTATION: molecular orientations induced through stretching of the filaments comprising the tubular web.

WEB: an assembly of substantially interconnected filaments.

FILAMENT ALIGNMENT ANGLE: alignment of fibers in relation to the machine direction of the web as determined by the natural splitting tendency of the web. It is expressed as the angle between the splitting direction and the machine direction of the web.

BONDING: consolidation of webs or extruded fabrics into a coherant composite structure. Consolidation may be accomplished via heat & pressure, adhesive bonding, mechanical entanglement or any other known process used to produce papers and nonwoven fabric.

FILAMENT CROSS-CUTTING: cutting across the filaments of the tubular web while the web is advancing axially and rotating about its central axis.

EXTRUDED FABRIC: a web of interconnected fibers continuously produced from a common melt source.

Figure 1:
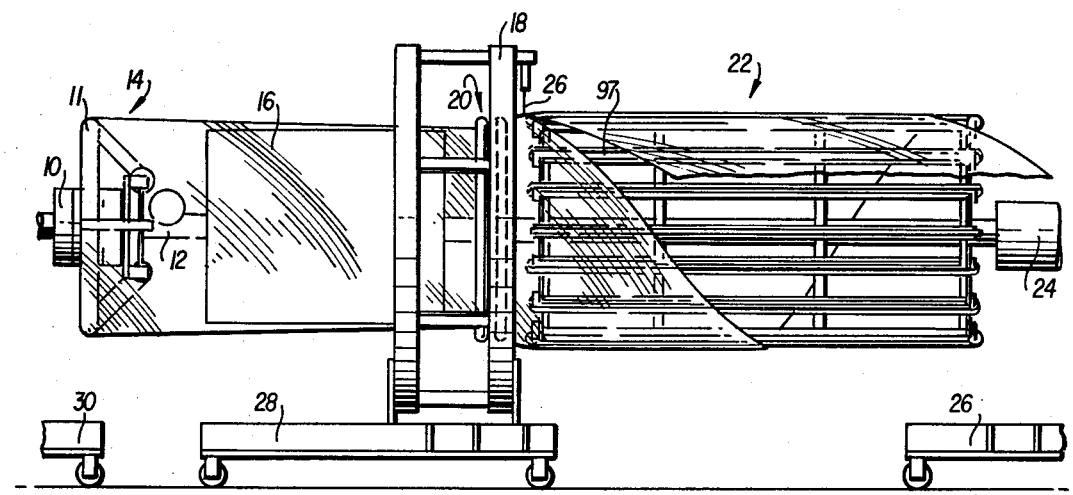
FIG. 1 is a general schematic of a preferred embodiment of the basic components of the present invention.

Referring now more specifically to the drawings there is shown in FIG. 1 the schematic representation of a preferred embodiment of the basic components of the present invention. An extruder die 10, shown here as a radial die, is mounted on a shaft 12 and is rotatable therewith. Also mounted on shaft 12 and rotatable therewith is a rotatable ring structure 14 which will be discussed in more detail as the description proceeds. A heater 16, also mounted on the shaft, extends axially into the area wherein a mounting structure 18 supports a particular nip roll configuration 20. Subsequent to the nip roll, a belted cage 22 is also mounted on the shaft 12 for rotation therewith with the shaft being rotated by means of a motor 24. The entire system is mounted on a base, shown here as movable dollies 26, 28 and 30. It is to be understood that the system could be permanently mounted in any area if so desired.

Figure 2:
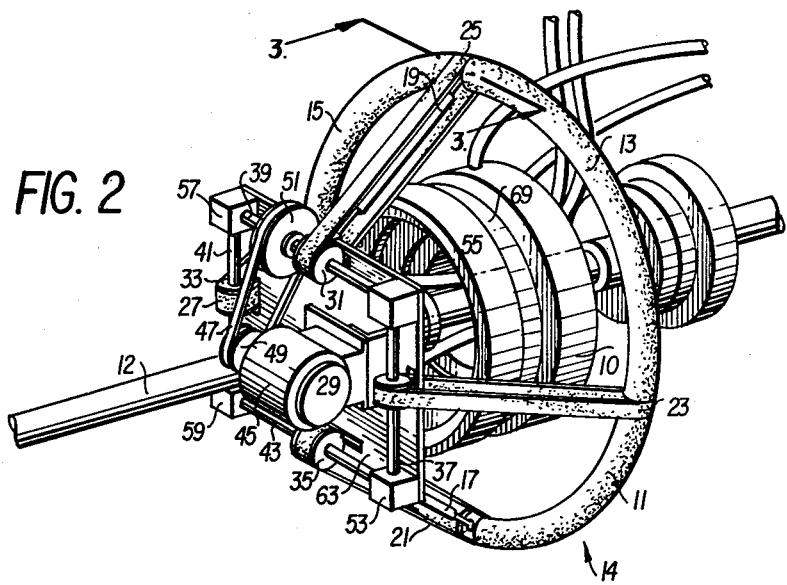
FIG. 2 is a perspective view of one of the rings used in a preferred embodiment of the present invention shown mounted with an extruding device.

In FIG. 2, there is shown a substantially 360° ring 14 composed of ring sections 11, 13, 15 and 16. Support arms such as 17 and 19 extend between a fixed structure and the interior of the ring in a manner which will become obvious as the discussion proceeds. Drive belts 21, 23, 25 and 27 are associated with each support arm and pass beyond both ends thereof. While one end of the belt passes about the ring, the other end of each belt passes over driven pulleys 29, 31, 33 and 35. Each of these pulleys is mounted on and rotatable with their respective shafts 37, 39, 41 and 43.

A motor 45 provides the necessary driving force by use of belt 47 and associated pulleys 49 and 51. Pulley 51 is secured to shaft 39 so as to cause rotation thereof.

Although various mechanical interconnections could be made, the structure shown uses four right angle gear drives 53, 55, 57 and 59 to drive the individual shafts associated therewith.

The motor and the gear drive bosses are shown mounted on a plate 63 which is secured to shaft 12 which is connected to the basic mounting structure and is rotatable as hereinafter discussed.

The power driven ring is shown mounted together with an extruder 10 which, in the embodiment shown is a radial extruder. In this specific operation the polymeric material is extruded through the radial extruder, and passes over the ring 11. The entire structure is mounted on shaft 12 for rotation therewith.

Turning now more specifically to FIGS. 3 and 4, there is shown a cross section of the ring itself having centrally located therein a rigid circular circumferential axle 71. Each of the support arms such as arm 19 terminate at their outward ends in a support housing 73 which maintains axle 71 in a fixed position. Load carrying radial bearings 75 are carried by the circular axle adjacent to each of the support housings and are maintained in position by means such as a spacer 77 together with a set collar 79. Additional bearings are provided about the circumference of the axle by means of spool containers 81 which are also maintained in position by their associated spacers 83.

A roll body 85 is formed about the circular axle by means of a wound helix 87 which is mounted over a drive pulley 81. In the configuration shown wherein the ring is comprised of four 90° segments, each of these segments terminate at either end in such a pulley. In order to assure that the pulley and the belt 25 are maintained in proper alignment, the pulley may be grooved as at 93 to mate with the flanges 95 and 96.

In order to reduce wear on the belt 25, one of the flanges, such as flange 95 is either molded into the belt or glued thereto while the other flange 96 is only frictionally engaged with the belt. This allows for small lateral flexing without excessive wear on the belt and flanges.

The helix is preferrably covered with a knit type fabric 97 with the most extensible direction of the fabric along the axis of the helix. The fabric is then covered with an elastomeric shell 99 to provide a surface having enough friction to transmit a pulling force to the material being processed.

As can be seen from the drawings, the pulley is of a width and thickness such that it comprises a mating connection between adjacent roll bodies and provides a smooth continuous outer surface.

The apparatus as described above provides a power driven ring which is capable of sustaining high radial loading and yet is sufficiently elastic parallel to its axis to permit extension and compression as it rotates about the circular axle.

The number of radial segments used may be varied to some degree. As a matter of fact, a single circular segment could be used with a single drive belt. However, the use of such a single segment would require an excessive amount of power to overcome the forces exerted by the inherent physics of the device. The use of multiple segments reduces the power requirements and allows for greater speed of operation.

In use, it has been found that varying the diameter of the ring has not impaired the efficiency of the machine. A machine has been constructed which operates efficiently with large differences in size.

Turning now to FIG. 5, there is shown a schematic illustration of the movement of the web 91 through the nip roll structure 20 and onto the belted cage 22. The particular nip roll shown comprises two circular driven rolls 93 and 95 constructed substantially the same as the roll 11 previously described. These two rolls are spaced a slight distance apart as indicated by the arrows. Adjacent to the driven rolls 93 and 95 is an idler roll 97 which is movable laterally in the direction shown by the arrows. In the representation illustrated in FIG. 5, the idler roll is shown binding against both of the driven rolls so as to provide the necessary pressure on the web 91 as it is pulled by the total nip roll structure. The circular web passes out of the nip roll 20 and is picked up by the belt cage 22 which will be described subsequently in greater detail.

Figure 6:
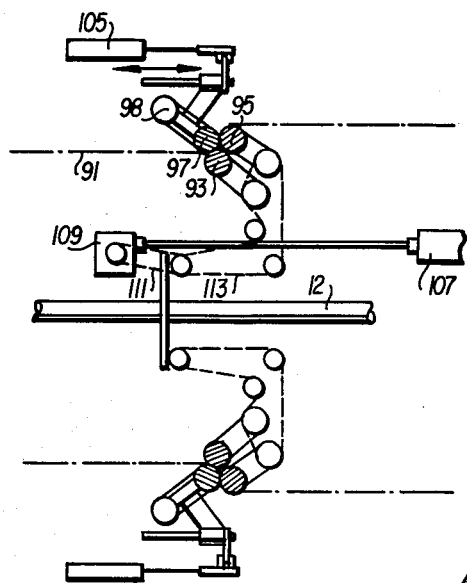
FIG. 6 is schematic illustration of the operation of the nip roll device of FIG. 1.

FIG. 6 is a schematic illustration of the drive means for the nip roll structure 20. The circular rings 93 and 95 are illustrated as being driven in a manner such as the ring 11 described in connection with FIG. 2. The idler ring 97 is on a structure which also includes a belt about a further idler roll 98 and is moved in the direction shown by the arrows by a driving means such as a hydraulic cylinder 105. This allows the web to be fed between the two driven rolls 93 and 95 and the idler roll 97 with the idler roll subsequently being moved into the position shown in both FIGS. 5 and 6 so as to nip the web and move it onward towards the cage 22. There is further shown schematically a motor 107 and a gear box 109 with sprockets chain drives 111 and 113 which drive the driven rolls 93 and 95.

Figure 7:
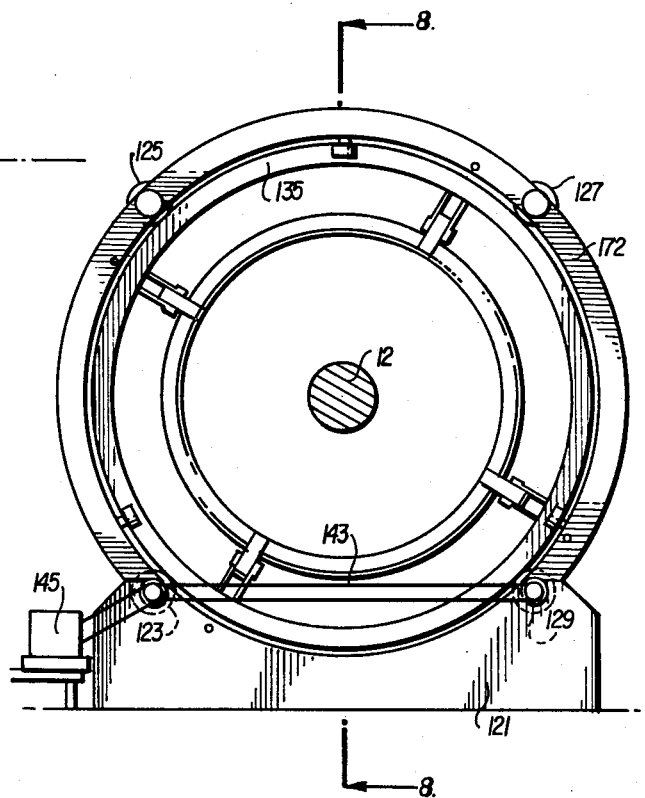
FIG. 7 is an elevational view of the support structure for the nip roll.
Figure 8:
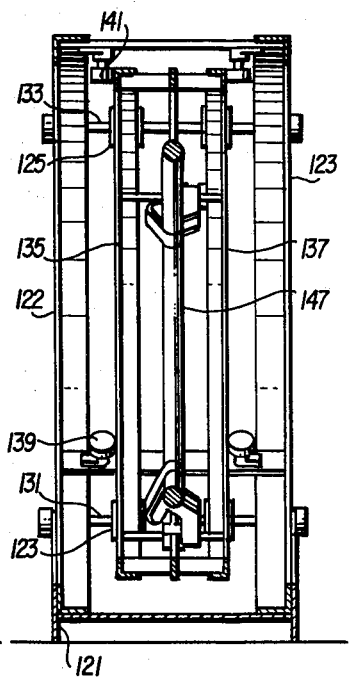
FIG. 8 is a sectional view taken along the lines 8—8 of FIG. 7.

Turning now to FIGS. 7 and 8 there is shown a plan view and a partial sectional side view of the method for mounting the nip roll structure. In order to avoid unnecessary complications in the drawings, there is illustrated only one of the driven rolls of the basic structure.

There is illustrated a base support structure 121 which encloses ring support structures 122 and 123. Mounted within the ring support structure and spaced about the periphery thereof are a plurality of roller bearings 123, 125, 127 and 129. Each of the roller bearings are comprised of two separate rollers which are separated and supported by means such as shafts 131, 133 and other shafts for each of the sets of roller bearings. These roller bearings support circular frames 135 and 137 to that these frames are rotatable within the bearing structure. In order to maintain the circular frames in position, there are provided a series of roller bearings 139, 141 which comprise opposite bearing structures and thus maintain the entire circular frame structure in a fixed lateral position.

A motor 145 drives two of the sets of roller bearings 123 and 129 through a chain drive mechanism 143. The motor is adjusted so as to rotate the nipper rolls about their axis at the same speed of rotation as shaft 12.

The rotating ring structure such as ring 147 is supported within the rotating circular frames and is driven in a manner similar to that shown in FIG. 1. Thus, the nipper ring structure and the frame in which it is carried are able to rotate about a horizontal axis together with the rest of the equipment involved.

Figure 9:
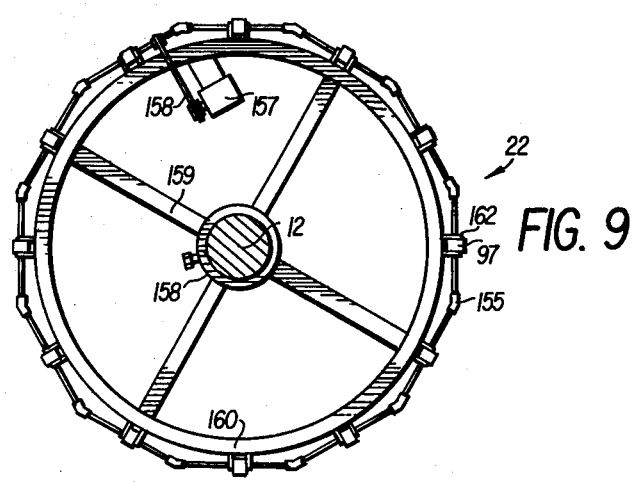
FIG. 9 is a partial end view of the cage structure shown in FIG. 1.

FIG. 9 is a schematic end view of the rotating cage structure 22. The plurality of moving belts 97 are mounted on a frame structure by means of rods 159 which in turn are fixedly mounted on the axle 12 by means such as collar 160 and are rotatable with the axle. Rods 159 support a plurality of circular frames 160. These frames, in turn support pulley blocks 162 which carry the pulleys about which belts 97 pass. Each of the pulleys are interconnected by means of a universal gear mechanism 155. A single motor 157 is secured to and is rotatable with the entire structure and drives the belts through a single pulley drive 158.

As can be seen, all of the individ components with the exception of the nip roll structure, which is independently driven, while operating in their desired manner, are mounted to and are rotatable with the basic shaft 12. Accordingly, as the material passes through the nip rolls and onto the belted cage 22, it is being rotated at a selected speed.

Figure 10:
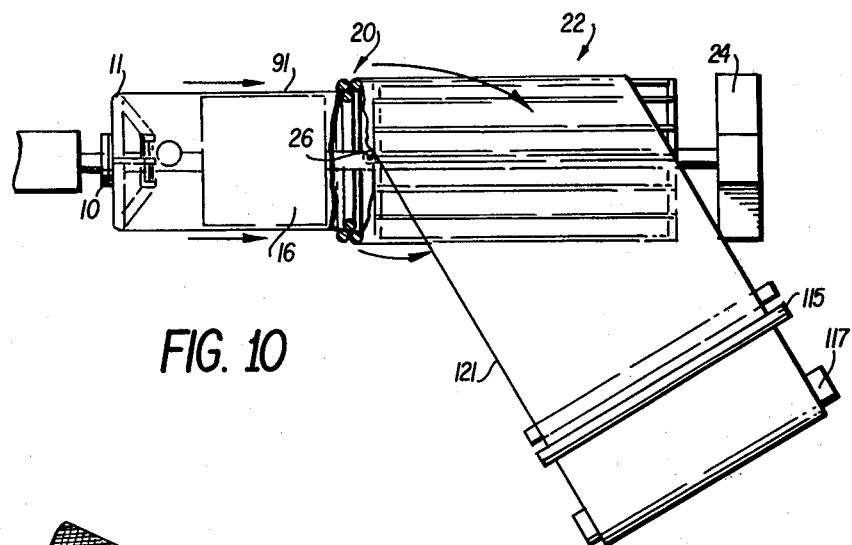
FIG. 10 is a schematic illustration of the operation of the system.

Turning now to FIG. 10, there is shown a schematic illustration of the entire system indicateing the movement of the fabric 91 as it passes over the initial ring 11, over heated cylinder 16 through the nip roll 20, and onto the belted cage 22. As shown in that illustration, and also in FIG. 1, there is a cutter, which may simply be a wire 26, which is held stationary with respect to the rest of the moving and rotating system. Accordingly, as the material is moving through the nip rolls and rotating about a common axis the cutter will sever the web so that is is cut at an angle depending on the speed of the material $U_L$ and the speed of rotation $U_R$. The cut material passes outwardly of the cage, is picked up through rollers 115 and wound on a spool 117. Thus, the filament cross-cutting of the web occurs.

The operation as described above provides a helical let-off of the web. This helical let-off changes the filament alignment as described below.

As the material passes along the basic rotating structure the filament alignment will be in the machine direction. However, when the material is cross-cut as indicated, the filament direction does not change with respect to the material. However, cutting at an angle causes the filament alignment to now appear at an angle across the new direction of the web as indicated by the lines in the drawing. This angle $\alpha$ is equal to arc tan $U_R/U_L$. Additionally, the width W is equal to the circumference of the tube $\phi$ times cos $\alpha$.

The operational relationships of the system are shown in the following table, using a linear speed of one unit.

| Lin Speed of Tube, $U_L$ | Rotational speed of Tube, $U_R$ | Circumference of tube, $\phi$ | Crosscut angle arc tan $\alpha \frac{U_R}{U_L}$ | Width of cross cut material $\frac{W}{\pi D} \cos \alpha$ | $\frac{W}{\phi}$ | $\frac{U_L}{U_R}$ |
|---|---|---|---|---|---|---|
| 1 | 0.5 | $\pi D$ | 26.56° | $\pi D$ | 0.89 | 2 |
| 1 | 1 | $\pi D$ | 45° | $\pi D$ | 0.71 | 1 |
| 1 | 1.5 | $\pi D$ | 56.3° | $\pi D$ | 0.55 | 0.67 |
| 1 | 2 | $\pi D$ | 63.4° | $\pi D$ | 0.45 | 0.5 |

The value of preparing the web material so that it has the filament alignment discussed above, is that it may be plied so that the multiple plies have at least one web with the filament direction being at cross angles to the adjacent web.

Figure 11:
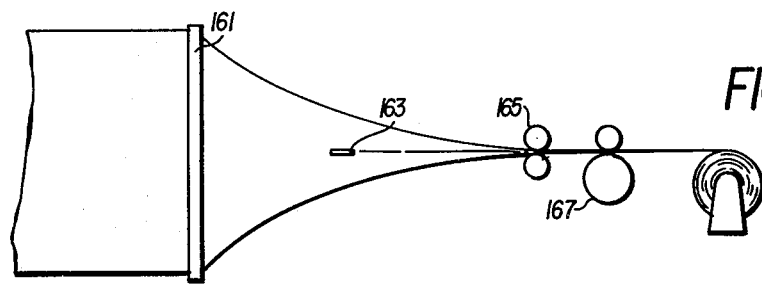
FIG. 11 is a schematic illustration of a modified takeup system.

FIG. 11 shows a schematic representation of one means of accomplishing this type of operation wherein the web material, after it is released from the rotating cage, passes over a roller 161 and outwardly therefrom and is further pressured by means such as a roller 163 so as to cause the material to fold upon itself and subsequently be passed through the nip roller 165. The material may be passed through a set of rolls including enlarged roll 167 which may be heated for bonding and/or embossing. The material is then taken up onto spool 169. This type of operation results in a multiple web material wherein the adjacent plies have a filamentry angle opposite each other. This results in a multiply structure which can have substantially the same strength in the machine direction as it does in the transverse direction, provided the cross-cut angle is about 45 degrees.

Since the filament angle is adjustable as discussed above, structures may be engineered which have most of their load bearing fibers in the transverse direction. This is desirable for stitch bonding since stitching, then, reinforces the machine direction to produce balance again. In many other applications, fabrics which are biased in the transverse direction are desirable.

Figure 12:
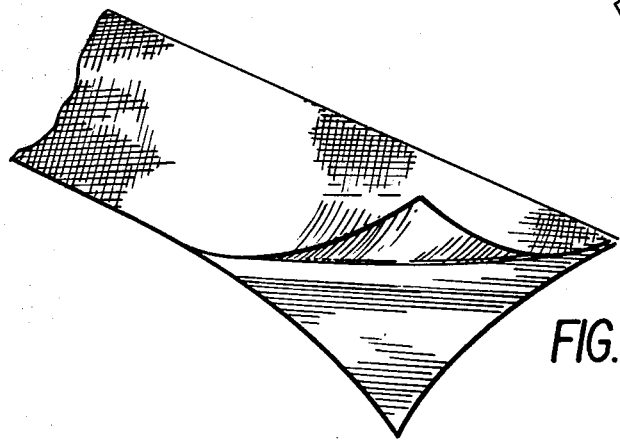
FIG. 12 is a schematic illustration of the product of the system of FIG. 11.

FIG. 12 is a schematic illustration of the resultant product of the process as shown in FIG. 11. The schematic shows the cross filament angle which exists between the two plies. It is to be understood that equipment could be provided which would result in a product having more than two plies.

The process as shown may attain filament attenuation formed by melt phase distortion as described in the above mentioned application. Filament attenuation may also be attained by stretching a foam structure into interconnected filaments by using the roll structures to cause stretching.

In the above-described system, it should be noted that filament orientation may be obtained by increasing the speed of rotation of the nip roll rings 20 about their own axis relative to the speed of rotation of the ring structure 14 about its own axis. In this stretching operation, filament orientation occurs as the web passes over heater 16. This provides additional strength within the web.

If no orientation is desired, the nip roll 20 and the heater 16 may be eliminated and the belted cage may be mounted adjacent ring structure 14 to split the web and provide the helical let-up.

The filament alignment angle is directly related to the width of the material as provided by the helical letup. Due to this width relationship, there exists a practical limitation of 10 to 80 degrees for the filament alignment angle.

One of the major advances provided by the present invention is that a product is obtained which is of indeterminate length, that is, a length not limited by the width of the material produced. In other words, the length may be continuous as long as the process is in operation and is, therefore, infinitely greater than the width of the material. In known indexing techniques, all multiply structures are limited by the width of the material produced.

It is to be understood that the above description and drawings are illustrative only since individual components may be modified without departing from the invention. Accordingly, the invention is to be limited only by the scope of the following claims:

We claim:

1. Apparatus for providing a thermoplastic web of indeterminated length comprising
    means for producing a molten thermoplastic extrudate;
    means for forming a tubular web of interconnected filaments from said extrudate;
    means for advancing said tubular web along its axis;
    means for rotating said web about its axis while it is being advanced; and
    means for slitting said web at an angle to the direction of advancement.

2. The apparatus of claim 1 further comprising means for providing a helical let-off of said web.

3. The apparatus of claim 1 further comprising means for forming said slitted web into a multiply structure.

4. The apparatus of claim 3 further comprising means for bonding the webs of said multiply structure.

5. The apparatus of claim 1 further comprising means for folding said slitted web so as to provide a multiply structure.

6. The apparatus of claim 5 further comprising means for bonding the webs of said multiply structure.

7. The apparatus of claim 1 further comprising means for molecular orientating said formed tube structure prior to the slitting thereof.

8. A system for producing a non-woven polymeric material comprising
an extruding device for extruding said material in a tubular configuration;
a first ring rotatable about its own circumferential axis, said tubular material from said extruding device passing over the outer circumference of said first ring;
means for rotating said first ring about its circumferential axis;
means for mounting said second and third ring in rotatable contact with said forth ring and substantially coaxially with each other and with said first ring;
means for rotating said second, third and fourth rings about their circumferential axes so as to advance said tubular material away from said first ring while exerting a stretching effect thereon; and
means for rotating said extruding device and said rings about a centrally disposed axis.

9. The system of claim 8 wherein said means for rotating said rings comprises
a separate variable speed motor for individually driving said rings.

10. The system of claim 8 further comprising
means for heating said tubular material located between said first ring and said second ring.

11. The system of claim 8 wherein
said fourth ring is located so that the direction of movement of the tubular material between said third and fourth ring is substantially perpendicular to the direction of movement of the tubular material between said first and second ring.

12. The system of claim 8 wherein
said third ring is located so that the direction of movement of the tubular material between said third and fourth rings is at an angle to the direction of movement of the tubular material between said first and second rings.

13. A system for producing a non-woven polymeric material comprising
an extruding device for radially extruding said material in a tubular configuration;
a ring rotatable about its own circumferential axis, said tubular material from said extruding device passing over the outer circumference of said ring;
a rotating cage structure substantially coaxial with said ring about which said tubular material passes comprising
a plurality of continuous belts axially arranged about the periphery of said cage;
means for driving said belts so as to move said tubular material away from said rotatable ring;
means for rotating said extruding device, and said cage structure about the common axes thereof;
a stationary cutter mounted adjacent said rotating cage structure for slitting said tubular material; and
means for picking up and storing said slit material.

14. A nip roll structure comprising
first and second circular rings rotatable about their own circumferential axes;
means for mounting said first and second rings substantially coaxial and in abutting relationship;
drive means for rotating at least one of said rings about its own circumferential axis;
a third ring rotatable about its own circumferential axis;
means for mounting said third ring substantially coaxial with said first and second rings; and
means for selectively axially moving said third ring into and out of contact with said first and second rings.

15. The nip roll of claim 14 wherein both of said first and second rings are rotated by said drive means.

16. The nip roll of claim 14 wherein said means for axially moving said third ring comprises
a hydraulic cylinder connected to said means for mounting said third ring.

* * * * *